United States Patent [19]
Yamamoto

[11] Patent Number: 5,673,775
[45] Date of Patent: Oct. 7, 1997

[54] LOCK-UP CONTROL DEVICE FOR LOCK-UP TYPE TORQUE CONVERTER AND MULTI-STAGE HYDRAULIC PRESSURE CONTROL DEVICE SUITABLE FOR THE LOCK-UP CONTROL DEVICE

[75] Inventor: Masahiro Yamamoto, Zama, Japan

[73] Assignee: Nissan Motor Co., Ltd., Yokohama, Japan

[21] Appl. No.: 579,366

[22] Filed: Dec. 27, 1995

[30] Foreign Application Priority Data

Dec. 27, 1994 [JP] Japan .................. 6-325643
Dec. 27, 1994 [JP] Japan .................. 6-325647

[51] Int. Cl.$^6$ ................................ F16H 61/14
[52] U.S. Cl. ...................... 192/3.29; 74/732.1
[58] Field of Search ............ 192/3.29, 3.3; 74/732.1

[56] References Cited

U.S. PATENT DOCUMENTS

| | | | |
|---|---|---|---|
| 3,058,373 | 10/1962 | Snoy et al. | 192/3.3 X |
| 4,618,038 | 10/1986 | Ogasawara et al. | 192/3.29 |
| 4,768,632 | 9/1988 | Moan | 192/3.3 |
| 5,152,386 | 10/1992 | Imamura | 192/3.3 X |
| 5,343,990 | 9/1994 | Iizuka | 192/3.29 X |

FOREIGN PATENT DOCUMENTS 5-81794  11/1993  Japan .

OTHER PUBLICATIONS

"Service Manual For Nissan RE4R01A–Type Full–Range Electronically–Controlled Automatic Transmission" issued by Nissan Motor Co., Ltd. (Mar. 1987).

*Primary Examiner*—Richard M. Lorence
*Attorney, Agent, or Firm*—Foley & Lardner

[57] ABSTRACT

A lock-up type torque converter includes a lock-up control device having a lock-up control valve, an input element and an output element. The torque converter also includes a supply line to supply operating fluid to the lock-up control valve. The supply line has a regulator valve for regulating pressure of the operating fluid in the supply line by selectively connecting the supply line to an oil cooler or a drain line. An applying chamber is situated on a first side of a lock-up clutch and a releasing chamber is situated on a second, opposite side of the lock-up clutch. In a releasing position, the lock-up control valve supplies operating fluid to the torque converter such that the operating fluid flows from the releasing chamber to the applying chamber to shift the lock-up clutch to a converter state in which the input element and the output element are indirectly mechanically linked to each other through the operating fluid. In a lock-up position the lock-up control valve supplies operating fluid to the torque converter such that the operating fluid flows from the applying chamber to the releasing chamber to shift the lock-up clutch to a lock-up state in which the input element and the output element are directly mechanically linked to each other.

6 Claims, 4 Drawing Sheets

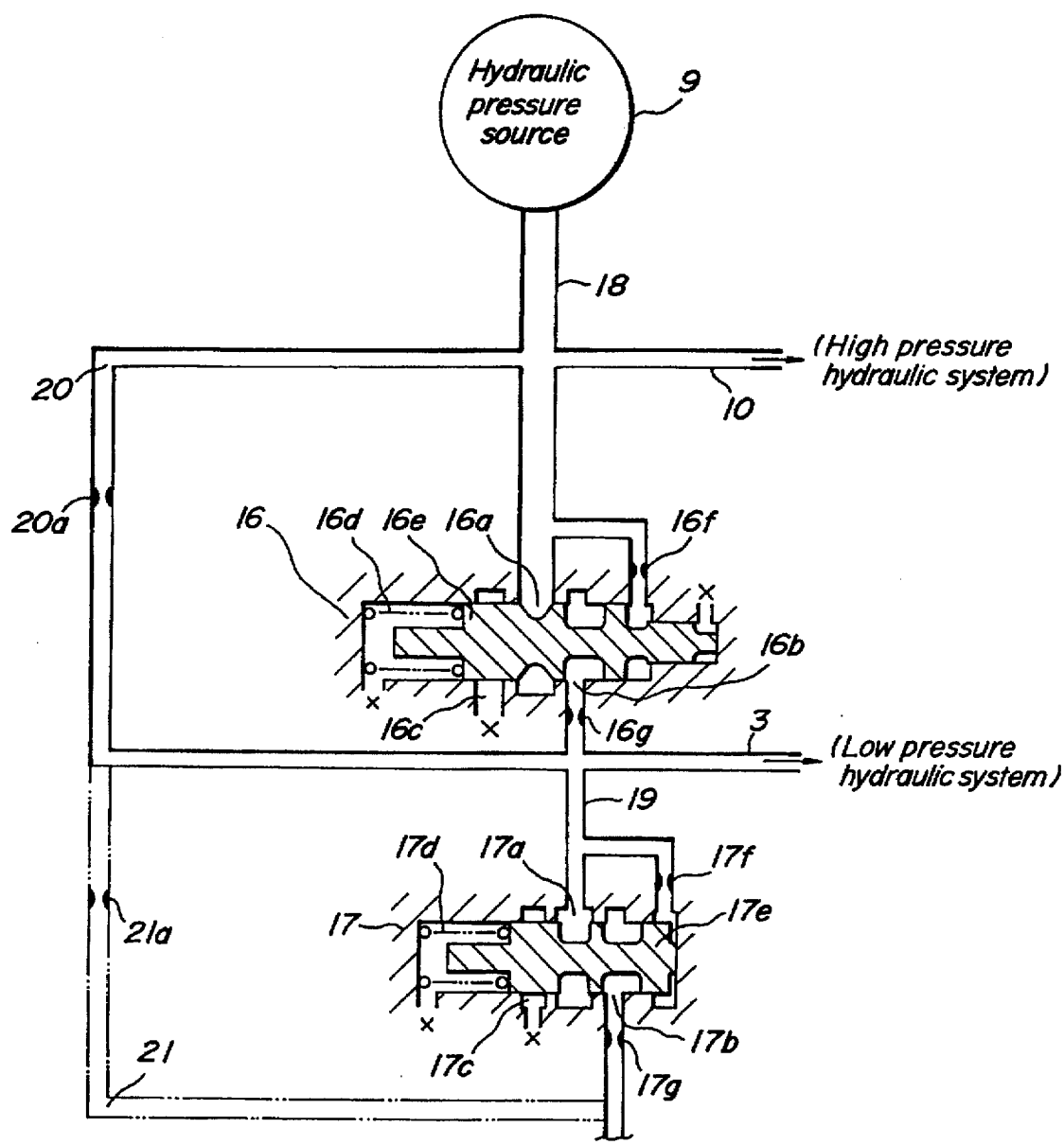

FIG_3
PRIOR ART
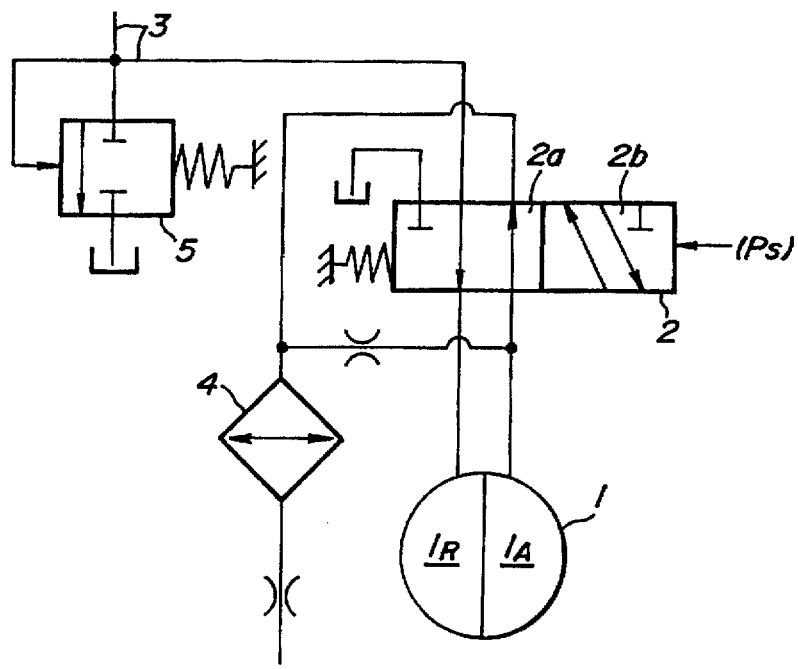
FIG_4
PRIOR ART
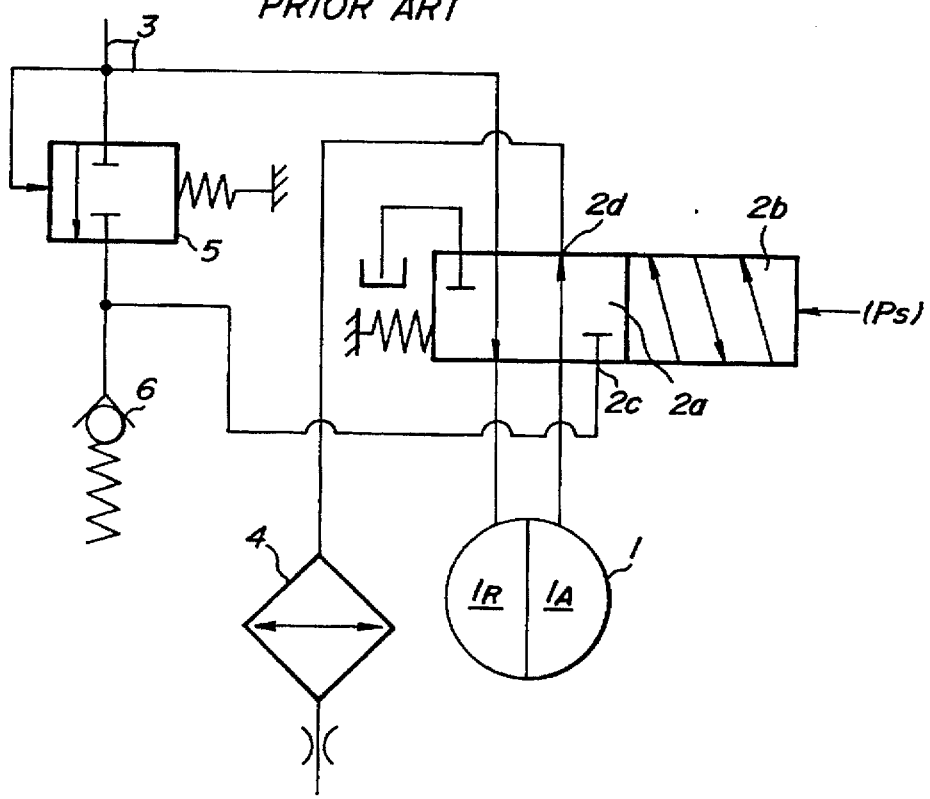

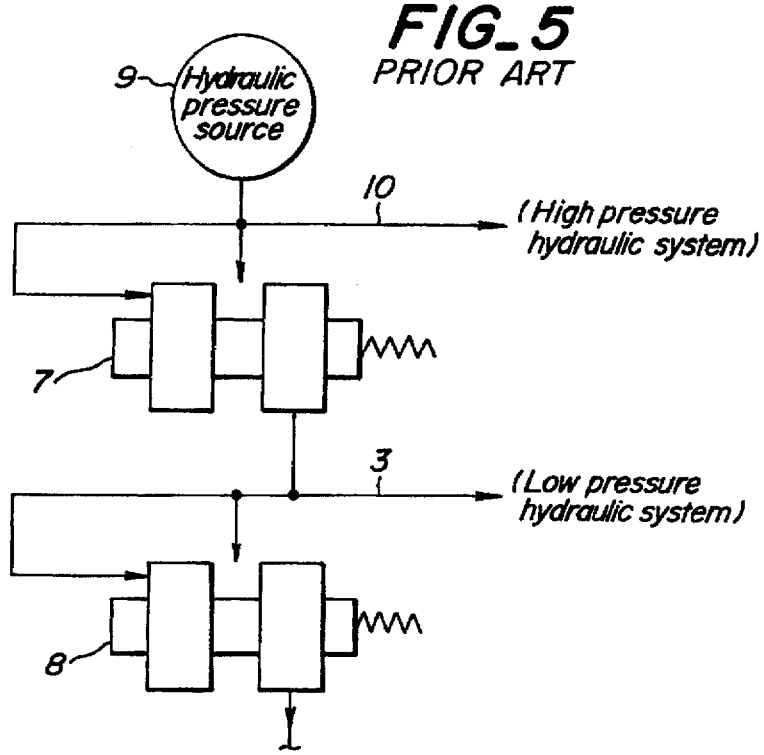
FIG_5 PRIOR ART
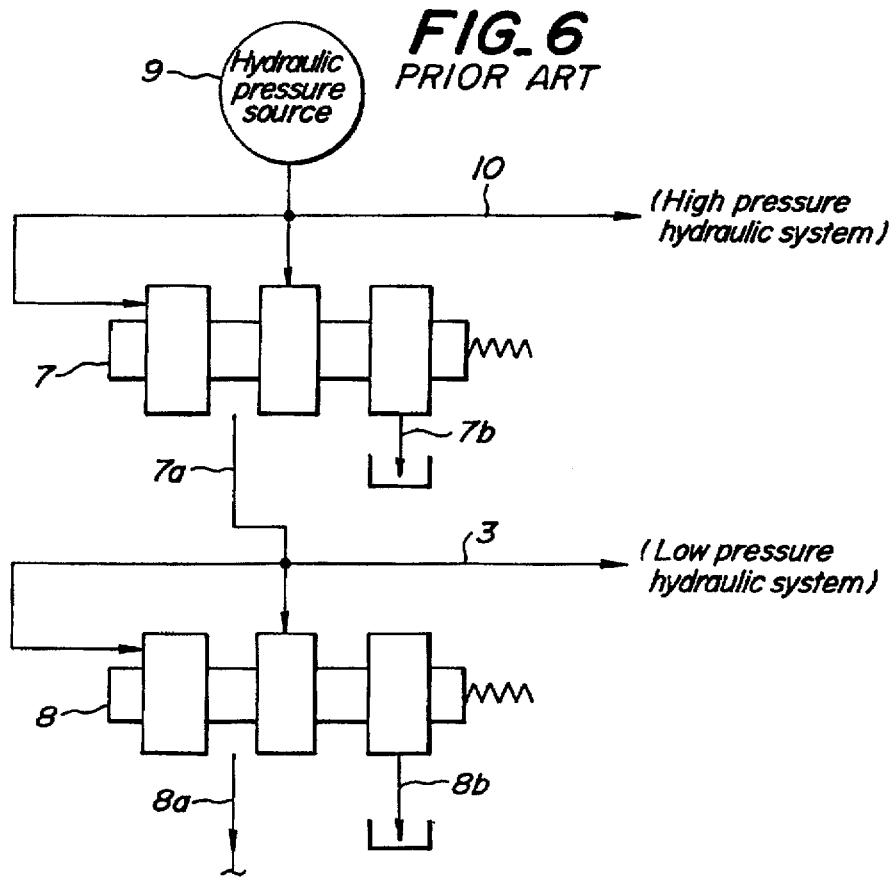
FIG_6 PRIOR ART

LOCK-UP CONTROL DEVICE FOR LOCK-UP TYPE TORQUE CONVERTER AND MULTI-STAGE HYDRAULIC PRESSURE CONTROL DEVICE SUITABLE FOR THE LOCK-UP CONTROL DEVICE

BACKGROUND OF THE INVENTION

1. Field of the Invention

The present invention relates to a lock-up control device for a lock-up type torque converter for a transmission system such as an automatic transmission for an automotive vehicle. More specifically, the present invention relates to a lock-up control device which increases durability of the lock-up type torque converter.

The present invention further relates to a multi-stage hydraulic pressure control device suitable for the lock-up control device.

2. Description of the Related Art

A torque converter for a transmission system typically contains operating fluid (usually, operating oil) therein, and drives an output element (usually, a turbine runner) by forcing the operating fluid to the output element by means of an input element (usually, a pump impeller) driven by an input rotating power. The operating fluid is then redirected to the input element using a resistant element (usually, a stator). Thus, the torque converter drives the output element with the operating fluid under a torque enhancing action and a torque fluctuation absorbing action. Consequently, the torque converter causes a slip between the input and output elements, resulting in decreased power transmitting efficiency.

In recent years, a lock-up type torque converter is used in many cases. The lock-up type torque converter can assume a lock-up state in which the torque converter is locked up so that the input and output elements are directly connected to each other by an engaging operation of a lock-up clutch therein, in relatively high rotating speed ranges in which the aforementioned torque enhancing action and the torque fluctuation absorbing action are not required. Such a lock-up type torque converter typically comprises an applying chamber at one side of the lock-up clutch and a releasing chamber at the other side of the lock-up clutch. When operating fluid is supplied to the torque converter such that it flows from the releasing chamber toward the applying chamber, the lock-up clutch is released and the lock-up type torque converter assumes a converter state in which the input and output elements are indirectly connected to each other through the operating fluid. On the contrary, when the operating fluid is supplied to the torque converter such that it flows from the applying chamber toward the releasing chamber, the lock-up clutch is engaged, then the lock-up type torque converter assumes the lock-up state in which the input and output elements are directly connected to each other.

Such controlling of lock-up is generally carried out by a lock-up control device as described in, for example, "SERVICE MANUAL FOR RE4R01A TYPE AUTOMATIC TRANSMISSION" issued in March, 1987, by Nissan Motor Co., Ltd., i.e. as shown in FIG. 3.

In FIG. 3, there is shown a lock-up type torque converter 1. The torque converter 1 comprises an applying chamber $1_A$ at one side of a lock-up clutch and a releasing chamber $1_R$ at the other side of the lock-up clutch, interposing the lock-up clutch therebetween. When operating fluid is supplied to the torque converter 1 such that the operating fluid flows from the releasing chamber $1_R$ toward the applying chamber $1_A$, the lock-up clutch is released and the torque converter 1 assumes the converter state in which the input and output elements are indirectly connected to each other through the operating fluid. On the contrary, when the operating fluid is supplied to the torque converter 1 such that the operating fluid flows from the applying chamber $1_A$ toward the releasing chamber $1_R$, the lock-up clutch is engaged and the torque converter 1 assumes the lock-up state in which the input and output elements are directly connected to each other.

Changing over of the states of the torque converter 1 is carried out by a lock-up control valve 2. The lock-up control valve 2 can selectively occupy a releasing position $2a$ as a normal position and a lock-up position $2b$ depending upon the valve of a lock-up signal pressure $P_S$. In the releasing position $2a$, the lock-up control valve 2 supplies the operating fluid from a supplying line 3 to the torque converter 1 such that the operating fluid flows from the releasing chamber $1_R$ toward the applying chamber $1_A$. On the contrary, in the lock-up position $2b$, the lock-up control valve 2 supplies the operating fluid from the supplying line 3 to the torque converter 1 such that the operating fluid flows from the applying chamber $1_A$ toward the releasing chamber $1_R$.

In the meantime, the operating fluid, after flowing through the torque converter 1, is required to be cooled. Therefore, in the known control device shown in FIG. 3, a line between the applying chamber $1_A$ and the lock-up control valve 2 is branched and connected to an oil cooler 4 to direct the operating fluid to the oil cooler.

However, in the known lock-up control device employing such an operating fluid cooling system, when the torque converter 1 is in the lock-up state and the lock-up control valve 2 occupies the lock-up position $2b$ to provide a flow of operating fluid from the applying chamber $1_A$ toward the releasing chamber $1_R$, a quantity of the operating fluid supplied to the applying chamber $1_A$ is reduced by a quantity of the operating fluid diverted to the oil cooler 4, so that an engaging capacity (i.e. a lock-up capacity) of the lock-up clutch becomes insufficient, especially in a condition in which an absolute quantity of the operating fluid is reduced, which may lessen durability of the torque converter 1.

To prevent the aforementioned problem, an operating fluid cooling system as shown in FIG. 4 has been considered, utilizing a relief valve 5 provided to the supplying line 3 and a pressure hold valve 6 provided and connected to a drain port of the relief valve 5. A line between the relief valve 5 and the pressure hold valve 6 is connected to a port $2c$ provided to the lock-up control valve 2. The port $2c$ is connected to another port $2d$ of the lock-up control valve 2 when the lock-up control valve 2 occupies the lock-up position $2b$. The port $2d$ is connected to the oil cooler 4.

In such a lock-up control device, when the lock-up control valve 2 occupies the releasing position $2a$ to direct flow of the operating fluid from the releasing chamber $1_R$ toward the applying chamber $1_A$ and the torque converter 1 is in the converter state, the operating fluid flows toward the oil cooler 4 after flowing through the torque converter 1 as shown in FIG. 3. On the other hand, when the lock-up control valve 2 occupies the lock-up position $2b$ to direct flow of the operating fluid from the applying chamber $1_A$ toward the releasing chamber $1_R$ and the torque converter 1 is in the lock-up state, a pressure of a remainder port of the operating fluid is held constant by the pressure hold valve 6, such that the remainder port of the operating fluid flows toward the oil cooler 4 through the ports $2c$, $2d$. Therefore, a quantity of the operating fluid supplied to the applying chamber $1_A$ is not reduced by a quantity of the operating fluid flowing to the oil cooler 4. Therefore, the aforementioned problem of reduction of lock-up capacity is overcome.

However, it has been found that, in case of employing the latter cooling system, the lock-up control valve 2 is required to be provided with the new port $2c$, so that a new problem arises that a composition of the lock-up control valve 2 becomes complex and production cost of the lock-up control valve 2 becomes higher due to the increased number of ports. Moreover, the latter cooling system requires a pressure hold valve 6 downstream from the relief valve 5 to drain the remainder port of the operating fluid flow in the converter state, so that a relief function of the relief valve 5 is lessened when a flow quantity in the supply line 3 is increased. This lessening of the relief function causes an increase of inner pressure of the torque converter 1. Thus, another problem arises that the torque converter 1 is required to be additionally strengthened to prevent a great deformation thereof when the inner pressure is increased.

An automatic transmission for an automotive vehicle usually requires plural degrees of hydraulic pressure to be regulated appropriately and to operate plural hydraulic systems including a lock-up control device as mentioned before and e.g. a speed change mechanism known per se.

With reference to controlling plural hydraulic systems which require different pressure degree ranges to be controlled, a multi-stage hydraulic pressure control device as shown in FIG. 5 is considered. The control device shown in FIG. 5 is provided with plural pressure control valves 7, 8, which have different pressure degree controlling ranges. The plural pressure control valves 7, 8 are connected to a hydraulic pressure source 9, such as an oil pump. The valves are connected in order of pressure degree controlling range from the highest range to the lowest range, to control hydraulic pressures for corresponding hydraulic systems such as a high pressure hydraulic system 10 (such as a speed change mechanism) and a low pressure hydraulic system 3 (such as a lock-up control device), respectively.

However, in such a hydraulic pressure control device, each of the pressure control valves 7, 8 expels remainder fluid to effect pressure control, and all of the remainder fluid is supplied to downstream control valves. The downstream control valves regulate the supplied fluid to control corresponding hydraulic systems. Consequently, in a condition in which a quantity of the fluid supplied from the hydraulic pressure source 9 is increased, the fluid cannot completely be drained, so that the pressure difference between the high pressure hydraulic system 10 and the low pressure hydraulic system 3 cannot correctly be produced, causing incorrect control of these hydraulic systems. Further, if the downstream pressure control valve 8 becomes unopenable due to sticking, the hydraulic pressure for the upstream high pressure system 10 becomes uncontrollable and is kept at an excessively high level which may cause difficulty in controlling the high pressure system 10.

Therefore, an improved multi-stage pressure control device schematically shown in FIG. 6 is proposed by the Japanese Patent Publication No. JP-B-5-81794. In the hydraulic pressure control device shown in FIG. 6, each of the pressure control valves 7, 8 selectively connects an input port to a connecting line $7a$, $8a$ reaching to a downstream pressure control valve and a drain line $7b$, $8b$, so as to control a hydraulic pressure for a corresponding hydraulic system 10, 3.

With the hydraulic pressure control device shown in FIG. 6, even when a quantity of the fluid supplied from the hydraulic pressure source 9 is increased, excess fluid can be drained due to the presence of the drain lines $7b$, $8b$, so that incorrect control of these hydraulic systems can be prevented. Further, even if downstream pressure control valve 8 becomes unopenable due to sticking, the hydraulic pressure for the upstream side high pressure system 10 is not kept at an excessively high level due to the presence of the drain lines $7b$, $8b$.

However, it has been found that, in the hydraulic pressure control device shown in FIG. 6, a new problem arises. That is, if a greater part of the fluid flowing into the input port is drained to the drain line $7b$, $8b$ due to sticking of at least one of the pressure control valves 7, 8 in an open position, the presence of the drain line $7b$, $8b$ causes a disadvantage that, in addition to a hydraulic system corresponding to the sticking valve, other hydraulic systems corresponding to downstream normal pressure control valve 8 cannot be supplied with a hydraulic pressure. This case may also cause difficulty in controlling the high pressure system.

SUMMARY OF THE INVENTION

It is therefore an object of the present invention to provide an improved lock-up control device for a lock-up type torque converter, which can overcome the problem of the operating fluid cooling system of the known device shown in FIG. 3 in a way other than employing the cooling system of the latter device shown in FIG. 4.

A further object of the present invention is to provide an improved multi-stage pressure control device suitable for the lock-up control device, which can overcome the problems other hydraulic systems have with sticking valves not supplying the correct hydraulic pressure.

Briefly stated, the present invention provides a lock-up control device for a lock-up type torque converter, the torque converter includes an applying chamber at one side of a lock-up clutch and a releasing chamber at another side of the lock-up clutch to selectively assume either a converter state wherein input and output elements of the torque converter are indirectly connected to each other through operating fluid in the torque converter, or a lock-up state wherein the input and output elements are directly connected to each other by the lock-up clutch. The lock-up control device includes either a lock-up control valve which selectively occupies a releasing position in which the lock-up control valve supplies operating fluid to the torque converter such that the operating fluid flows from the releasing chamber toward the applying chamber to put the torque converter in the converter state, or a lock-up position in which the lock-up control valve supplies operating fluid to the torque converter such that the operating fluid flows from the applying chamber toward the releasing chamber to put the torque converter in the lock-up state.

In the lock-up control device according to the present invention, there is provided a regulator valve for regulating a pressure of the operating fluid in a supplying line for supplying the operating fluid to the lock-up control valve by selectively connecting the supplying line to a line extending to an oil cooler and a drain line.

With the lock-up control device according to the present invention, the regulator valve regulates a pressure of the operating fluid in the supplying line by selectively connecting the supplying line to an oil cooler line and a drain line and supplies the operating fluid to the lock-up control valve. Then, when in the releasing position, the lock-up control valve supplies operating fluid to the torque converter such that the operating fluid flows from the releasing chamber toward the applying chamber and the torque converter switches to the converter state wherein the input and output elements of the torque converter are indirectly connected to each other through the operating fluid. On the contrary, when in the lock-up position, the lock-up control valve supplies operating fluid to the torque converter such that the operating fluid flows from the applying chamber toward the releasing chamber and the torque converter switches to the lock-up state wherein the input and output elements of the torque converter are directly connected to each other by the lock-up clutch.

Meanwhile, whether the torque converter is in the converter state or lock-up state, after regulating with the converter regulator valve, a remainder port of the operating fluid flows to the oil cooler, so that a quantity of the operating fluid supplied to the torque converter is not reduced by a quantity of the operating fluid flowing to the oil cooler. Therefore, a lock-up capacity of the lock-up clutch does not become insufficient even in a condition in which an absolute quantity of the operating fluid is reduced. Thus, the aforementioned problem of lessened durability of the torque converter caused by reduction of lock-up capacity can be overcome.

Further, with the lock-up control device according to the present invention, the aforementioned advantageous effect can be achieved without increasing a number of ports of the lock-up control valve, so that a complex composition and hence increased production cost of the lock-up control valve can be avoided.

Furthermore, with the lock-up control device according to the present invention, the regulator valve regulates a pressure of the operating fluid in the supplying line by selectively connecting the supplying line to the oil cooler line and the drain line, so that the regulator valve does not excessively increase the pressure of the operating fluid to be supplied to the lock-up control valve and hence to the torque converter, even when a quantity of the operating fluid is increased. Thereby, the torque converter is not required to be additionally strengthened to prevent a great deformation due to high inner pressure, because the inner pressure of the torque converter is not excessively increased. Thus, in addition to the aforementioned advantages, increasing weight and production cost of the torque converter can be avoided.

In a preferred embodiment of the lock-up control device according to the present invention, when the lock-up control valve occupies the releasing position, a port of the lock-up control valve from which the operating fluid flows from the applying chamber is connected to the oil cooler line.

With the preferred embodiment of the present invention, when the lock-up control valve occupies the releasing position to put the torque converter in the converter state, in addition to the remainder port of the operating fluid in the supplying line, the operating fluid from the applying chamber is forwarded to the oil cooler to cool the operating fluid. Thereby, a cooling ability for the operating fluid can be enhanced advantageously in the converter state.

Further, briefly stated, the present invention provides a multi-stage hydraulic pressure control device suitable for the lock-up control device, the hydraulic pressure control device includes plural pressure control valves with differing pressure degree controlling ranges. The plural pressure control valves are connected to a hydraulic pressure source by the order of pressure degree controlling range from the highest range, so as to control hydraulic pressures for corresponding hydraulic systems respectively.

In the multi-stage hydraulic pressure control device according to the present invention, each of the pressure control valves selectively connects an input port to a connecting port and a drain port thereof to control a hydraulic pressure for a corresponding hydraulic system. The input port of the pressure control valve of the highest range is connected to the hydraulic pressure source, and the input port of the pressure control valve downstream is connected through a restrictor to the connecting port of the pressure control valve of the next highest (upstream) range.

With the multi-stage hydraulic pressure control device according to the present invention, each of the plural pressure control valves controls a hydraulic pressure for a corresponding hydraulic system, by connecting an input port of the valve to a connecting port and a drain port of the valve selectively. The input port is supplied with hydraulic fluid from the hydraulic pressure source or the connecting port of the pressure control valve of the next highest (upstream) range.

In the meantime, with the multi-stage hydraulic pressure control device according to the present invention, even in a condition in which a quantity of the fluid supplied from the hydraulic pressure source is increased, due to the presence of the drain port the fluid can be drained enough, so that incorrect control of these hydraulic systems can be prevented. Further, even if the downstream pressure control valve becomes unopenable due to sticking, due to the presence of the drain port the hydraulic pressure for the upstream high pressure system is not kept in excessively high condition.

Further, with the multi-stage hydraulic pressure control device according to the present invention, an input port of each of the downstream pressure control valves is connected through a restrictor to a connecting port of the upstream pressure control valve of the nearest range. Therefore, even if a greater part of the fluid flowing into the input port is drained to the drain port due to sticking of at least one of the pressure control valves in an open position, the presence of the drain port does not invite a disadvantage that, in addition to a hydraulic system corresponding to the sticking valve, other hydraulic systems corresponding to upstream normal pressure control valves cannot be supplied with a hydraulic pressure.

In a preferred embodiment of the multi-stage hydraulic pressure control device according to the present invention, each of the pressure control valves is provided with a bypass line directly connecting the input port and the connecting port, the bypass line permits bypassing of a quantity of the hydraulic fluid such that control of the pressure control valve is not disturbed.

With the preferred embodiment of the present invention, a bypass line directly connecting the input port and the connecting port permits bypassing a quantity of hydraulic fluid such that controlling action of the pressure control valve is not disturbed. Therefore, even when one of the pressure control valves is stuck in an open position, except a hydraulic system corresponding to the sticking valve, other hydraulic systems corresponding to downstream normal pressure control valves can be supplied with a hydraulic pressure due to the by-pass flow of the hydraulic fluid.

BRIEF DESCRIPTION OF THE DRAWINGS

The present invention will now be explained in more detail with reference to preferred embodiments shown in the attached drawings, in which:

FIG. 2 is a schematic diagram showing a preferred example of a multi-stage hydraulic pressure control device according to the present invention suitable for the lock-up control device in FIG. 1;

FIG. 3 is a schematic diagram showing a known lock-up control device;

FIG. 4 is a schematic diagram showing a lock-up control device improved from the known lock-up control device in FIG. 3;

FIG. 5 is a schematic diagram showing a typical multi-stage hydraulic pressure control device; and FIG. 6 is a schematic diagram showing a known multi-stage hydraulic pressure control device improved from the typical multi-stage hydraulic pressure control device in FIG. 5.

DETAILED DESCRIPTION OF THE PREFERRED EMBODIMENTS

Figure 1:
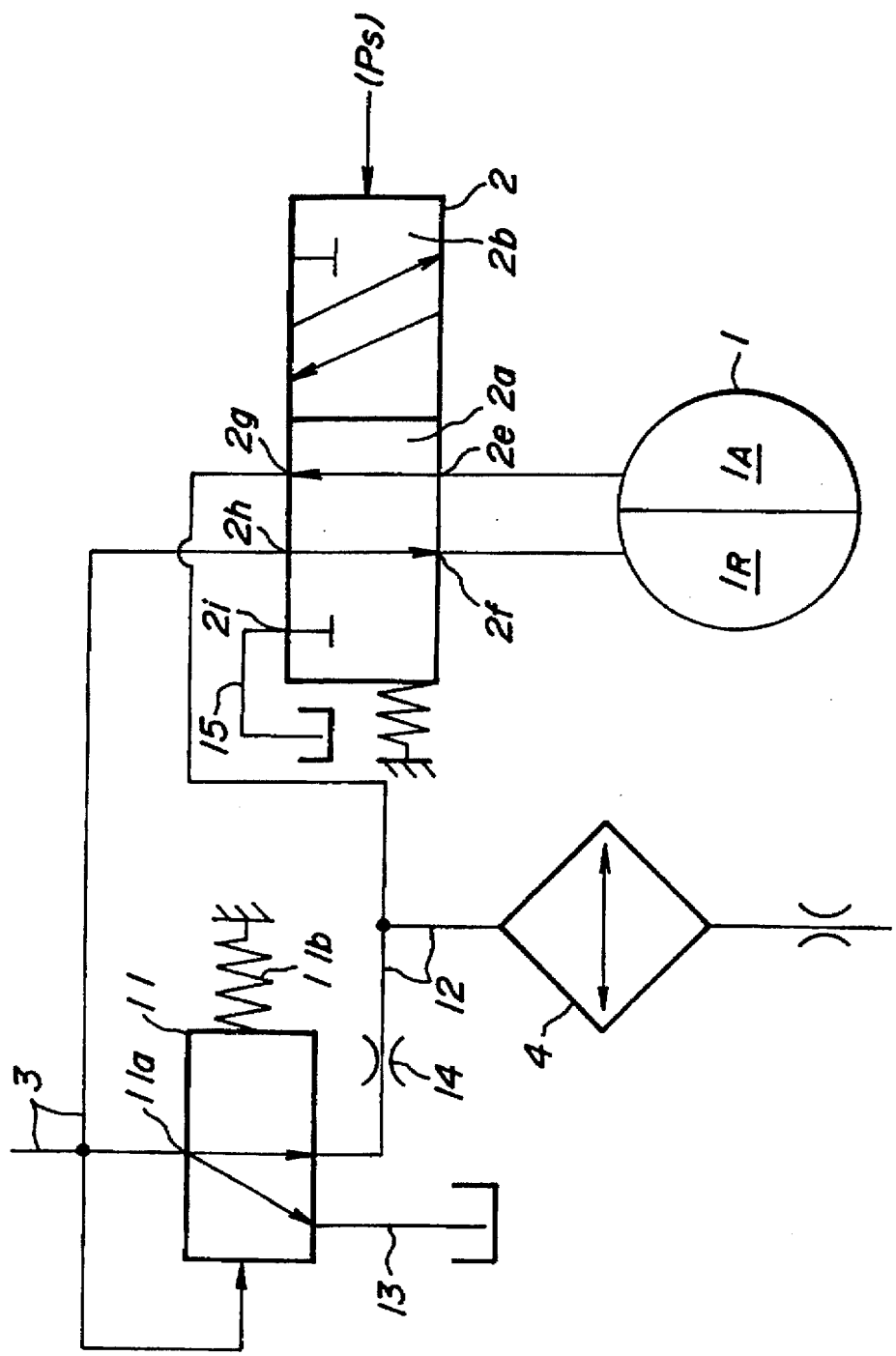
FIG. 1 is a schematic diagram showing a preferred example of a lock-up control device for a lock-up type torque converter according to the present invention.

Referring now to FIG. 1, there is shown one example of a lock-up control device for a lock-up type torque converter according to the present invention. This lock-up control device is suitable for a lock-up type torque converter cooperating with an automatic transmission for an automotive vehicle.

A lock-up type torque converter 1 shown in FIG. 1 also comprises an applying chamber $1_A$ at one side of a lock-up clutch and a releasing chamber $1_R$ at another side of the lock-up clutch, interposing the lock-up clutch therebetween. When operating fluid is supplied from the supplying line 3 to the torque converter 1 such that the operating fluid flows from the releasing chamber $1_R$ toward the applying chamber $1_A$, the lock-up clutch is released and the torque converter 1 assumes the converter state in which input and output elements of the torque converter 1 are indirectly connected to each other through operating fluid contained in the torque converter 1. On the contrary, when the operating fluid is supplied from the supplying line 3 to the torque converter 1 such that the operating fluid flows from the applying chamber $1_A$ toward the releasing chamber $1_R$, the lock-up clutch is engaged and the torque converter 1 assumes the lock-up state in which the input and output elements are directly connected to each other.

Changing over of the states of the torque converter 1 is carried out by a lock-up control valve 2. When a lock-up signal pressure $P_S$ is not supplied, the lock-up control valve 2 occupies a releasing position 2a as a normal position. On the other hand, when the lock-up signal pressure $P_S$ is supplied, the lock-up control valve 2 occupies a lock-up position 2b. The lock-up control valve 2 has a port 2e connected to the applying chamber $1_A$, a port 2f connected to the releasing chamber $1_R$ and three other ports 2g, 2h, 2i. In the releasing position 2a, the port 2e connected to the applying chamber $1_A$ is connected to the port 2g, while the port 2f connected to the releasing chamber $1_R$ is connected to the port 2h, and further the port 2i is closed. On the other hand, in the lock-up position 2b, the port 2e connected to the applying chamber $1_A$ is connected to the port 2h, while the port 2f connected to the releasing chamber $1_R$ is connected to the port 2i, and further the port 2g is closed.

The port 2h is connected to the supplying line 3 which, in turn, is connected to a regulator valve 11 and a fluid pressure source (not shown) such as an oil pump known per se. The regulator valve 11 has an input port 11a connected to the supplying line 3. When a degree of a fluid pressure in the supplying line 3 is equal to or below a certain degree corresponding to a mechanical property of a spring 11b in the regulator valve 11, the regulator valve 11 connects the input port 11a to a line 12 reaching to an oil cooler 4, so as to increase the fluid pressure in the supplying line 3. On the other hand, when a degree of a fluid pressure in the supplying line 3 is above the aforementioned certain degree, the regulator valve 11 connects the input port 11a to a drain line 13 to reduce the fluid pressure in the supplying line 3. Thus, the regulator valve 11 regulates a pressure of the operating fluid in the supplying line 3 at a degree corresponding to the mechanical property of the spring 11b for supplying the operating fluid to the lock-up control valve by selectively connecting the supplying line 3 to the oil cooler line 12 and the drain line 13.

In the lock-up control device, the oil cooler line 12 is provided with an orifice 14 as a restrictor. The oil cooler line 12 between the orifice 14 and the oil cooler 4 is connected to the port 2g of the regulator valve 11. Further, the remainder port 2i of the regulator valve 11 is connected to a drain line 15.

With the lock-up control device according to the present invention, the regulator valve 11, as explained before, regulates a pressure of the operating fluid in the supplying line 3 at a degree corresponding to the mechanical property of the spring 11b for supplying the operating fluid to the lock-up control valve 2, by selectively connecting the supplying line 3 to the oil cooler line 12 and the drain line 13. The lock-up control valve 2 occupies the releasing position 2a when the lock-up signal pressure $P_S$ is not supplied. On the other hand, the lock-up control valve 2 occupies the lock-up position 2b when the lock-up signal pressure $P_S$ is supplied.

In the releasing position 2a, the lock-up control valve 2 supplies the operating fluid from the supplying line 3 to the torque converter 1 so that the operating fluid flows from the releasing chamber $1_R$ toward the applying chamber $1_A$ and the torque converter 1 changes to the converter state in which the input and output elements of the torque converter 1 are indirectly connected to each other through operating fluid contained in the torque converter 1. On the contrary, in the lock-up position 2b, the lock-up control valve 2 supplies the operating fluid from the supplying line 3 to the torque converter 1 so that the operating fluid flows from the applying chamber $1_A$ toward the releasing chamber $1_R$ and the torque converter 1 changes to the lock-up state in which the input and output elements of the torque converter 1 are directly connected to each other through the lock-up clutch.

In the meantime, despite whether the torque converter 1 is in the converter state or lock-up state, after regulating with the regulator valve 11, a remainder port of the operating fluid flows to the oil cooler 4, so that a quantity of the operating fluid supplied to the torque converter 1 in not reduced by a quantity of the operating fluid flowing to the oil cooler 4. Therefore, a lock-up capacity of the lock-up clutch does not become insufficient even in a condition in which an absolute quantity of the operating fluid is reduced. Thus, the aforementioned problem of deterioration of durability of the torque converter 1 caused by reduction of lock-up capacity can be overcome.

Further, with the lock-up control device according to the present invention, as clearly found from comparing with the device in FIG. 3, the aforementioned advantageous effect can be achieved without increasing the number of ports of the lock-up control valve 2, so that a complex composition of the lock-up control valve and hence increasing of production cost of the lock-up control valve can be avoided.

Furthermore, with the lock-up control device according to the present invention, the regulator valve 11 regulates a pressure of the operating fluid in the supplying line 3 by selectively connecting the supplying line 3 to the oil cooler line 12 and the drain line 13, so that the regulator valve 11 does not excessively increase the pressure of the operating fluid to be supplied to the lock-up control valve 2 and hence to the torque converter 1, even under a condition in which a quantity of the operating fluid is increased. Thereby, the torque converter 1 is not required to be additionally strengthened to prevent a great deformation due to high inner pressure, because the inner pressure of the torque converter 1 is not excessively increased. Thus, in addition to the aforementioned advantages, increasing the weight and production cost of the torque converter can be avoided.

Furthermore, with this example of the lock-up control device according to the present invention, when the lock-up control valve 2 occupies the releasing position 2a to put the torque converter 1 in the converter state, both the remainder port of the operating fluid in the supplying line 3 and the operating fluid from the applying chamber $1_A$ are forwarded to the oil cooler 4 so as to be cooled. Thereby, cooling of the operating fluid can be enhanced advantageously in the converter state.

Now, referring to FIG. 2, there is shown one example of a multi-stage hydraulic pressure control device according to the present invention suitable for the lock-up control device shown in FIG. 1.

The hydraulic pressure control device shown in FIG. 2 produces two hydraulic pressures of different pressure degree controlling ranges, for a high pressure hydraulic system 10 such as a speed change mechanism of an automatic transmission for an automotive vehicle and a low pressure hydraulic system 3 such as the aforementioned lock-up control device respectively, from pressurized hydraulic fluid flow supplied from a hydraulic pressure source 9 such as an oil pump in the automatic transmission.

The hydraulic pressure control device includes two pressure control valves 16 and 17 having different pressure degree controlling ranges. The high pressure control valve 16 and the low pressure control valve 17 have the same composition as follows, except the pressure degree controlling range thereof. That is, each of the pressure control valves 16, 17 has an input port 16a, 17a, a connecting port 16b, 17b, a drain port 16c, 17c, a spring 16d, 17d and a spool 16e, 17e, respectively. In each of the pressure control valves 16, 17, when the spool 16e, 17e is urged by the spring 16d, 17d and positioned in the rightward limited position as shown in FIG. 2, the spool 16e, 17e shuts away the input port 16a, 17a from both the connecting port 16b, 17b and the drain port 16c, 17c. The spool 16e, 17e, permits flowing of the hydraulic fluid between the input port 16a, 17a and the connecting port 16b, 17b by leaking of the hydraulic fluid through a gap around a corresponding land of the spool 16e, 17e, which partitions the connecting port 16b, 17b from the input part 16a, 17a.

Thereby, each of the pressure control valves 16, 17 produces a hydraulic pressure upstream from the input port 16a, 17a by a quantity of fluid flow over the aforementioned leaking quantity, and provides hydraulic pressure to the spool 16e, 17e through an orifice 16f, 17f so that the hydraulic pressure opposes an elastic force of the spring 16d, 17d. When the hydraulic pressure upstream from the input port 16a, 17a increases over a certain value corresponding to the elastic force of the spring 16d, 17d, the spool 16e, 17e is moved leftward into a position in which the input port 16a, 17a is communicated with the drain port 16c, 17c, expelling the hydraulic pressure over a value corresponding to the elastic force of the spring 16d, 17d. Consequently, each of the pressure control valves 16, 17 can control the hydraulic pressure upstream from the input port 16a, 17a at a pressure corresponding to the elastic force of the spring 16d, 17d.

With reference to the high pressure control valve 16, the input port 16a is connected to the hydraulic pressure source 9, while the connecting port 16b is connected to the input port 17a of the low pressure control valve 17. Further, the connecting port 17b of the low pressure control valve 17 is connected to an input port of another pressure control valve of a pressure degree controlling range lower than that of the low pressure control valve 17, if such a lower pressure control valve exists downstream from the low pressure control valve 17.

Further, the connecting port 16b, 17b of each of the pressure control valves 16, 17 has inserted therein an orifice 16g, 17g such as a restrictor having a cross-sectional area greater than that of the gap around the land of the spool 16e, 17e. The cross-sectional area of the orifice 16g, 17g is designed so that it permits production of a certain degree of hydraulic pressure upstream from the input port 16a, 17a, even in an abnormal case where the spool 16e, 17e remains sticking in a leftward limited position such that the input port 16a, 17a remains communicating with the connecting port 16b, 17b.

Further, the high pressure hydraulic system 10 is connected to a line 18 between the hydraulic pressure source 9 and the input port 16a of the high pressure control valve 16, while the low pressure hydraulic system 3 is connected to a line 19 between the connecting port 16b of the high pressure control valve 16 and the input port 17a of the low pressure control valve 17. Between the lines 18, 19, there is provided a bypass line 20 directly connecting the input port 16a and the connecting port 16b of the high pressure control valve 16. The bypass line 20 is interposed with an orifice 20a which permits bypassing of a quantity of the hydraulic fluid such that the controlling action of the high pressure control valve 16 is not disturbed.

Incidentally, if there is a lower pressure control valve downstream from the low pressure control valve 17, the low pressure control valve 17 is also provided with a bypass line 21 having an orifice 21a as shown in FIG. 2.

With the multi-stage hydraulic pressure control device according to the present invention, the high pressure control valve 16 controls the hydraulic pressure upstream from the input port 16a (i.e. the hydraulic pressure to the high pressure hydraulic system 10) in a pressure amount corresponding to the elastic force of the spring 16d by the aforementioned controlling action, from the operating fluid flow supplied from the hydraulic pressure source 9. Then, the low pressure control valve 17 controls the hydraulic pressure upstream from the input part 17a (i.e. the hydraulic pressure to the low pressure hydraulic System 3) in a pressure degree corresponding to the elastic force of the spring 17d by the aforementioned controlling action, from the operating fluid flow expelled from the connecting port 16b of the high pressure control valve 16 during the controlling action thereof. It is to be noted that the pressure degree controlling ranges of the pressure control valves 16, 17 determined with the springs 16d, 17d are different. Therefore, the pressure control valves 16, 17 can produce different degrees of hydraulic pressure in the high pressure hydraulic system 10 and the low pressure hydraulic system 3, respectively.

In the meantime, with the multi-stage hydraulic pressure control device according to the present invention, since the pressure control valves 16, 17 carry out pressure control by expelling from the drain ports 16c, 17c a part of operating fluid supplied to the input ports 16a, 17a, even in a condition in which a quantity of the fluid supplied from the hydraulic pressure source 9 is increased, enough fluid can be drained to prevent incorrect control of these hydraulic systems 10, 3. Further, even if the downstream pressure control valve 17 becomes unopenable due to sticking, due to the presence of the drain port 16c the hydraulic pressure for the upstream high pressure system 10 is not kept in excessively high condition.

Further, with the multi-stage hydraulic pressure control device according to the present invention, the input part 17a of the downstream pressure control valve 17 is connected through the orifice 16g to the connecting port 16b of the next highest (upstream) range pressure control valve 16. Therefore, even if a greater part of the fluid flowing into the input port 17a is drained to the drain port 17b due to e.g. sticking of the pressure control valve 17 in an open position, the orifice 16g assures the controlling action of the upstream pressure control valve 16. Thus, the disadvantage that, in addition to a hydraulic system corresponding to the sticking valve, other hydraulic systems corresponding to upstream normal pressure control valves cannot be supplied with a hydraulic pressure, can be prevented.

Furthermore, with this example of the multi-stage hydraulic pressure control device according to the present invention, the bypass lines 20, 21 with the orifices 20a, 21a added to directly connect the input ports 16a, 17a and the connecting ports 16b, 17b of the pressure control valves 16, 17, permit bypassing of a quantity of the hydraulic fluid by which a controlling action of the corresponding pressure control valve 16, 17 is not disturbed. Therefore, even if sticking occurs in at least one of the pressure control valves 16, 17 in an open position, except a hydraulic system corresponding to the sticking valve, other hydraulic systems corresponding to downstream normal pressure control valves can produce a hydraulic pressure from the by-pass flow of the hydraulic fluid.

The foregoing description is by way of example only, and not intended to limit the scope of the appended claims.

I claim:

1. A lock-up system comprising:

a lock-up type torque converter including a lock-up clutch, an applying chamber on a first side of the lock-up clutch and a releasing chamber on a second side of the lock-up clutch;

a lock-up control device including a lock-up control valve and a regulator valve;

a supply line for supplying operating fluid to the lock-up control valve, the regulator valve being disposed in the supply line and regulating pressure of the operating fluid in the supply line by selectively connecting the supply line to an oil cooler or a drain line; and an input element and an output element;

wherein in a releasing position the lock-up control valve supplies operating fluid to the torque converter such that the operating fluid flows from the releasing chamber to the applying chamber to shift the lock-up clutch to a converter state in which the input element and the output element are indirectly mechanically linked to each other through the operating fluid; and wherein in a lock-up position the lock-up control valve supplies operating fluid to the torque converter such that the operating fluid flows from the applying chamber to the releasing chamber to shift the lock-up clutch to a lock-up state in which the input element and the output element are directly mechanically linked to each other.

2. A lock-up system as claimed in claim 1, wherein when the lock-up control valve is in the releasing position, a port of the lock-up control valve allows operating fluid to flow from the applying chamber to the oil cooler.

3. A lock-up system as claimed in claim 1, further comprising a multi-stage hydraulic pressure control device including:

a hydraulic pressure source; and plural pressure control valves having different pressure degree control ranges and controlling different hydraulic systems;

wherein the plural pressure control valves are connected to the hydraulic pressure source in order of descending pressure degree control ranges from a highest pressure degree control range to a lowest pressure degree control range.

4. A lock-up system as claimed in claim 3, wherein each of the plural pressure control valves includes an input port, a connecting port and a drain port, wherein the input port, connecting port and drain port are selectively connected to control the hydraulic pressure for a corresponding hydraulic system.

5. A lock-up system as claimed in claim 4, wherein the input port of the pressure control valve of the highest pressure degree control range is connected to the hydraulic pressure source, and the input port of a next highest pressure control valve is connected through a restrictor valve to the connecting port of the pressure control valve of the highest pressure degree control range.

6. A lock-up system as claimed in claim 3, wherein each of the plural pressure control valves further includes a bypass line directly connecting the input port and the connecting port, the bypass line permitting bypassing of a quantity of hydraulic fluid.

* * * * *